(12) United States Patent
Jaitly (10) Patent No.: US 12,020,337 B2
(45) Date of Patent: Jun. 25, 2024

(54) SYSTEM AND METHOD FOR DATA VALIDATION AND CORRECTION IN A HYDROCARBON EXPLORATION SYSTEM (71) Applicant: Schlumberger Technology Corporation, Sugar Land, TX (US)

(72) Inventor: Mansi Jaitly, Los Angeles, CA (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 336 days.

(21) Appl. No.: 17/310,683

(22) PCT Filed: Mar. 27, 2020

(86) PCT No.: PCT/US2020/025381
§ 371 (c)(1),
(2) Date: Aug. 17, 2021

(87) PCT Pub. No.: WO2021/194510
PCT Pub. Date: Sep. 30, 2021

(65) Prior Publication Data
US 2022/0319164 A1 Oct. 6, 2022

(51) Int. Cl.
*G06Q 50/02* (2024.01)
*G06T 7/70* (2017.01)
*G06V 10/776* (2022.01)
*G06V 10/82* (2022.01)
(Continued)

(52) U.S. Cl.
CPC .............. *G06Q 50/02* (2013.01); *G06T 7/70* (2017.01); *G06V 10/776* (2022.01); *G06V 10/82* (2022.01);
(Continued)

(58) Field of Classification Search
CPC ...... G06Q 50/02; G06Q 10/0631; G06T 7/70; G06T 2207/30181; G06T 2207/20081;
(Continued)

(56) References Cited

U.S. PATENT DOCUMENTS

| 6,751,555 | B2 | 6/2004 | Poedjono | |
|---|---|---|---|---|
| 10,339,646 | B1 | 7/2019 | Adler | |
| 2020/0302029 | A1* | 9/2020 | Holm | H04N 21/4532 |

OTHER PUBLICATIONS

Using machine learning, Covington, 2019; https://skytruth.org/2019/02/using-machine-learning-to-map-the-footprint-of-fracking-in-central-appalachia/ (Year: 2019).*

(Continued)

*Primary Examiner* — Jianxun Yang
(74) *Attorney, Agent, or Firm* — Jeffrey D. Frantz (57) ABSTRACT

A hydrocarbon exploration system includes a plurality of computer nodes, each comprising a processor and memory coupled to the processor. The computer nodes are configured to implement a well identification system and a well location system. The well identification system is configured to analyze features of an image at a given set of geographic coordinates, and to determine, based on the features, whether a well is present at the geographic coordinates. The well location system is configured to, responsive to the well identification system determining that a well is not present at the geographic coordinates, render, at the geographic coordinates, a first indication of a potential incorrect location of the well in the image, and to render a second indication of a potential correct location of the well in the image.

20 Claims, 8 Drawing Sheets (51) Int. Cl.
  *G06V 20/10* (2022.01)
  *G06V 20/13* (2022.01)
(52) U.S. Cl.
  CPC .............. *G06V 20/10* (2022.01); *G06V 20/13* (2022.01); *G06T 2207/30181* (2013.01)
(58) Field of Classification Search
  CPC . G06T 2207/20084; G06T 2207/30184; G06T 7/73; G06V 10/776; G06V 10/82; G06V 20/10; G06V 20/13; G06V 20/176; G01C 11/04; G06F 16/29; G06N 3/045; G06N 3/08; G06N 20/00; G09B 29/003; G01N 33/241; G01N 33/28
  See application file for complete search history.

(56) References Cited

OTHER PUBLICATIONS

International Preliminary Report on Patentability of International Patent Application No. PCT/US2020/025381 dated Oct. 6, 2022, 6 pages.

Extended Search Report issued in European Patent Application No. 20927811.8 dated Nov. 11, 2024, 4 pages.

Brodrick, P. G. et al., 'Application of machine learning techniques for well pad identification in the Bakken oil field', <URL: http://cs229.stanford.edu/proj2014/Philip%20Brodrick,%20Jacob%20Englander,%20Application%20of%20machine%20learning%20techniques%20for%20well%20pad%20identification%20inathe%20Bakken%20oil%20fielda.pdf> Dec. 12, 2014, retrieved from the Internet on Aug. 17, 2021 (5 Pages).

Covington, R., 'Using machine learning to map the footprint of fracking in central Appalachia', FrackFinder, Hydraulic Fracturing, Watchdog, Feb. 13, 2019, https://skytruth.org/2019/02/using-machine-learning-to-map-the-footprint-of-fracking-in-central-appalachia/, [retrieved from internet on Aug. 17, 2021] (8 Pages).

Kansas Geological Survey, 'Interactive Oil and Gas Maps' and 'Oil and Gas Mapper Help Page', published on Sep. 6, 2019, http://www.kgs.ku.edu/PRS/petroMaps/index.html, [retrieved from internet on Aug. 17, 2021] (3 Pages).

International Search Report and Written Opinion issued on May 11, 2020 for the equivalent PCT/US2020/025381 (9 Pages).

* cited by examiner

SYSTEM AND METHOD FOR DATA VALIDATION AND CORRECTION IN A HYDROCARBON EXPLORATION SYSTEM

CROSS-REFERENCE TO RELATED APPLICATIONS

This application is the National Stage Entry of International Application No. PCT/US2020/025381, filed Mar. 27, 2020.

BACKGROUND

Many different types of data are employed in the exploration for and production of hydrocarbons, such as oil or gas. Modern mapping and visualization systems allow the many different types of data to be spatially displayed on a common map. For example, each type of data may be rendered as a different layer of the common map. The various types of data that may be of interest for hydrocarbon exploration and production include seismic data, well data, pipeline data, platform data, field data, prospect data, leasing block data, basin data, gravity data, magnetic data, bathymetry data, etc. Data ingested by the exploration/production system is received from many different sources and may vary in quality.

SUMMARY

A system and method for automated validation and correction of data in a hydrocarbon exploration/production are disclosed herein. In one example, a hydrocarbon exploration system includes a plurality of computer nodes, each comprising a processor and memory coupled to the processor. The computer nodes are configured to implement a well identification system and a well location system. The well identification system is configured to analyze features of an image at a given set of geographic coordinates, and to determine, based on the features, whether a well is present at the geographic coordinates. The well location system is configured to, responsive to the well identification system determining that a well is not present at the geographic coordinates, render, at the geographic coordinates, a first indication of a potential incorrect location of the well in the image, and to render a second indication of a potential correct location of the well in the image. The well identification system may include a convolutional neural network trained to identify a well feature at the geographic coordinates. The well feature may be a well pad. The well location system may be configured to display the image comprising the first indication, and to render, in conjunction with the image, a well information dialog configured to receive user entry of the potential correct location of the well. The well information dialog may be configured to receive (e.g., receive user entry of) a third indication of the potential incorrect location of the well in the image. The well information dialog may be configured to receive entry of well type information and well operator information. The plurality of computer nodes may be configured to implement an administration system configured to render an administration dialog that includes a well record comprising the first indication or the third indication of the potential incorrect location of the well in the image, and an entry field configured to receive acceptance of the second indication of the potential correct location as an accepted correct location of the well.

In another example, a method for validating and correcting well data includes configuring a plurality of computing nodes to provide a well identification system and a well location system. The method also includes analyzing, by the well identification system, features of an image at a given set of geographic coordinates, and determining, by the well identification system, based on the features, whether a well is present at the geographic coordinates. The method further includes rendering, by the well location system, at the geographic coordinates, a first indication of a potential incorrect location of the well in the image responsive to determining that the well is not present at the geographic coordinates, and rendering, by the well location system, a second indication of a potential correct location of the well in the image. The well identification system may include a convolutional neural network, and the method may include training the convolutional neural network to identify a well feature in the image. The well feature may be a well pad. The method may also include displaying, by the well location system, the image comprising the first indication, and rendering, by the well location system, in conjunction with the image, a well information dialog configured to receive user entry of the potential correct location of the well. The method may also include receiving, by the well information dialog, a third indication of the potential incorrect location of the well in the image. The method may also include receiving, by the well information dialog, user entry of well type information and well operator information. The method may also include configuring the plurality of computing nodes to provide an administration system, and rendering, by the administration system, an administration dialog. The administration dialog may include a well record comprising the first indication or the third indication of the potential incorrect location of the well in the image, and an entry field configured to receive acceptance of the second indication of a potential correct location as an accepted correct location of the well.

In a further example, a non-transitory computer-readable medium is encoded with instructions that when executed cause one or more processors to implement a well identification system and a well location system. The instructions also cause the one or more processors to analyze, by the well identification system, features of an image at a given set of geographic coordinates, and to determine, by the well identification system, based on the features, whether a well is present at the geographic coordinates. The instructions further cause the one or more processors to render, by the well location system, at the geographic coordinates, a first indication of a potential incorrect location of the well in the image responsive to determining that the well is not present at the geographic coordinates, and to render, by the well location system, a second indication of a potential correct location of the well in the image. The instructions may cause the one or more processors to implement a convolutional neural network trained to identify a well feature in the image. The instructions may cause the one or more processors to display, by the well location system, the image comprising the first indication, and to render, by the well location system, in conjunction with the image, a well information dialog configured to receive user entry of the potential correct location of the well. The instructions may cause the one or more processors to receive, by the well information dialog, a third indication of the potential incorrect location of the well in the image. The instructions may cause the one or more processors to implement an administration system, and to render, by the administration system, a well record comprising the first indication or the third indication of the potential incorrect location of the well in the image, and render, by the administration system, an entry field configured to receive acceptance of the second indication of a potential correct location as an accepted correct location of the well. The instructions may cause the one or more processors to receive, by the well information dialog, user entry of well type information and well operator information.

BRIEF DESCRIPTION OF THE DRAWINGS

For a detailed description of various examples, reference will now be made to the accompanying drawings in which.

DETAILED DESCRIPTION

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

Hydrocarbon exploration/production systems store, access, and apply a vast amount of data to identify, evaluate, and manage hydrocarbon reservoirs. For example, a hydrocarbon exploration system may include data identifying millions of existing land wells on a map of the earth. Information associated with these wells is applied to identify new well locations and/or manage production from the existing wells. Decisions based on the data provided by such a system may be compromised by errors in the data. Therefore, it is important that data stored in the system be validated, and corrected if found to be in error. In particular, the map locations of land wells should be validated and corrected if found to be in error.

In order to correct a data error, the error must first be identified. Identification of errors in millions of data records of a single type is a daunting task. Rule-based methods have been used in some systems, but may be unsuitable in systems that employ data sets of the size needed for hydrocarbon exploration. When an incorrect data value is identified, the correct value must be determined.

The hydrocarbon exploration system disclosed herein includes a well data validation and correction subsystem that analyzes images to determine whether a well is located at a geographic location specified in the stored data. A well identification system may analyze features of an image (e.g., a satellite image) of the purported well location to determine whether the features indicate that a well pad is present at the geographic location. The well identification system may include a convolutional neural network trained to identify a well pad. When a well location error is identified, a well location system provides for collaborative correction of the well location by allowing users of the hydrocarbon exploration system to propose a correct location of the well. A well data administration system allows a final well location to be selected from any number of proposed correct well locations.

Figure 1:
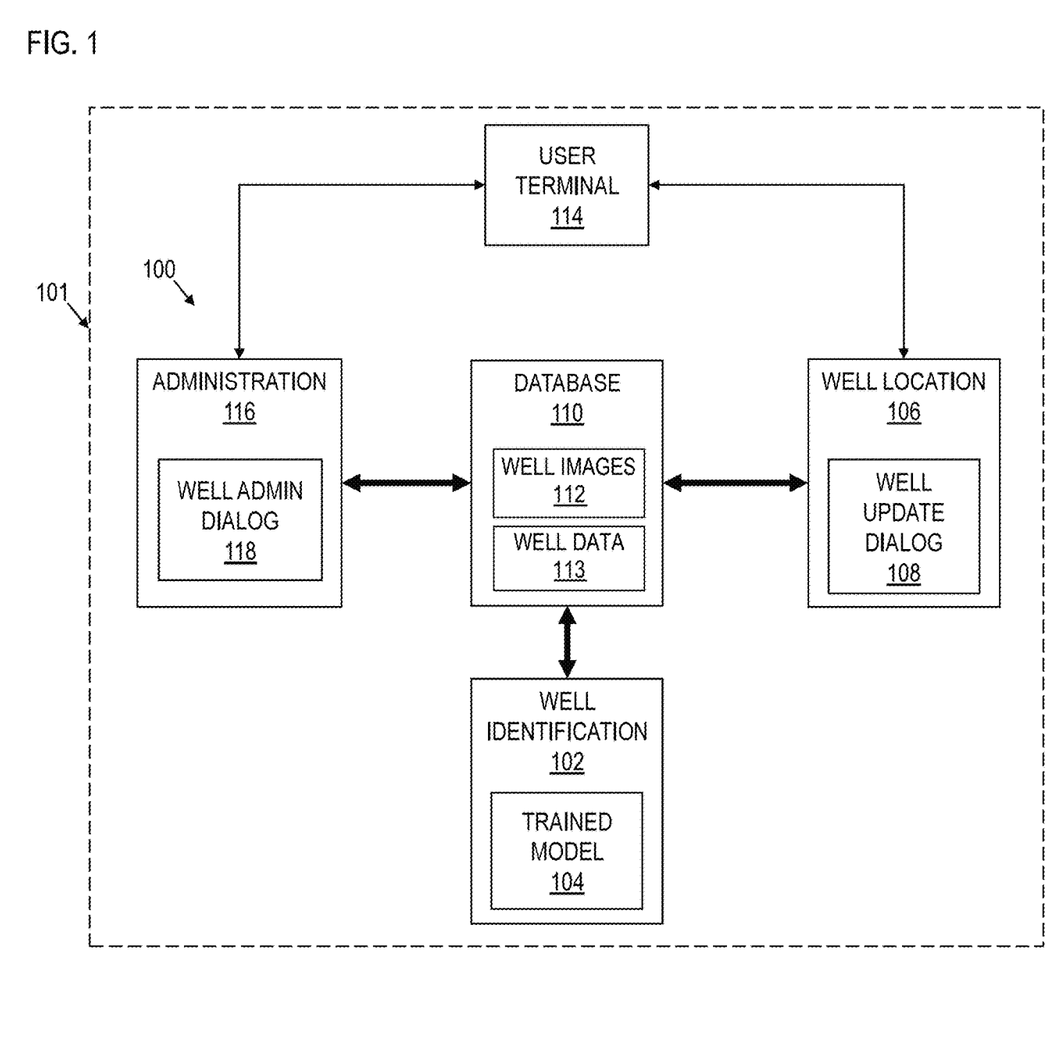
FIG. 1 shows a block diagram for an example sub-system of a hydrocarbon exploration system for validating and correcting well data in accordance with the present disclosure.

FIG. 1 shows a block diagram for an example well data validation and correction sub-system 100 of a hydrocarbon exploration system 101 for validating and correcting well data in accordance with the present disclosure. The well data validation and correction sub-system 100 includes a well identification system 102, a well location system 106, database 110, a user terminal 114, and a well data administration system 116. The database 110 stores well images 112 and well data records 113 to be validated and corrected. The well images 112 may be satellite images that include a purported well location according to the stored well data records 113.

The well identification system 102 retrieves the well images 112 and well data records 113 from the database 110 and analyzes features of each image at or about the purported geographic location of a well (the well location may be specified by geographic coordinates in the well data records 113) to determine whether a well is present at the geographic location. The well identification system 102 includes a machine learning model 104 trained to identify a well pad at a specified location. The machine learning model 104 is a convolutional neural network in some implementations of the well identification system 102. In such implementations, if a well pad is identified at a specified geographic location, then the well is deemed correctly located at the specified geographic location. On the other hand, if a well pad is not identified at a specified geographic location, then the well location is deemed to be incorrect. When the well identification system 102 identifies an error in well location, the well identification system 102 may add an indication of the error to the well data stored in database 110 for the well. The well identification system 102 allows for efficient and accurate identification of well location errors in the large volume (e.g., millions) of well images stored in the database 110.

The well location system 106 allows for collaborative correction of well locations found to be in error by the well identification system 102. The well location system 106 retrieves the well images 112 and the well data records 113 from the database 110 and displays a dialog 108 or other visual presentation of an image (e.g., a satellite image) on the user terminal 114 with an indication of a potentially incorrect location of a well in the image as stored in the database 110. The dialog 108 allows a user to view the incorrect well location and, via the user terminal 114, suggest a potential correct location of the well in the image. For example, if the image includes a well pad, then a user may enter information via the user terminal 114 to suggest the well is located on the well pad rather than at the potentially incorrect location indicated in the image. The well location system 106 may record the suggested location in the well data stored in the database 110 for the well, and render an indication of the suggested location for the well on the displayed image.

The dialog 108 provided by the well location system 106 may also allow a user to denote a well location identified on a displayed image to be incorrect, and/or to enter other information with respect to a well associated with the image. For example, the dialog may allow a user to enter well type information, well operator information, well status information and/or other information associated with the well.

The well data administration system 116 accesses the database 110 to retrieve the well images 112 and the well data records 113 and display one or more dialogs 118 related to the status of the well data records 113. For example, the well data administration system 116 may display a dialog 118 that identifies the various well records found to include incorrect geographical well location information as determined by the well identification system 102 or a user of the well data validation and correction sub-system 100, and/or suggested correct geographical locations for a well. The dialog 118 may allow an administrator of the hydrocarbon exploration system 101 to accept a suggested correct geographical location as the correct geographical location of the well.

Thus, the well data validation and correction sub-system 100 provides for efficient identification of errors in well location via the well identification system 102, and efficient correction of identified errors via the well location system 106 and the well data administration system 116.

Figure 2:
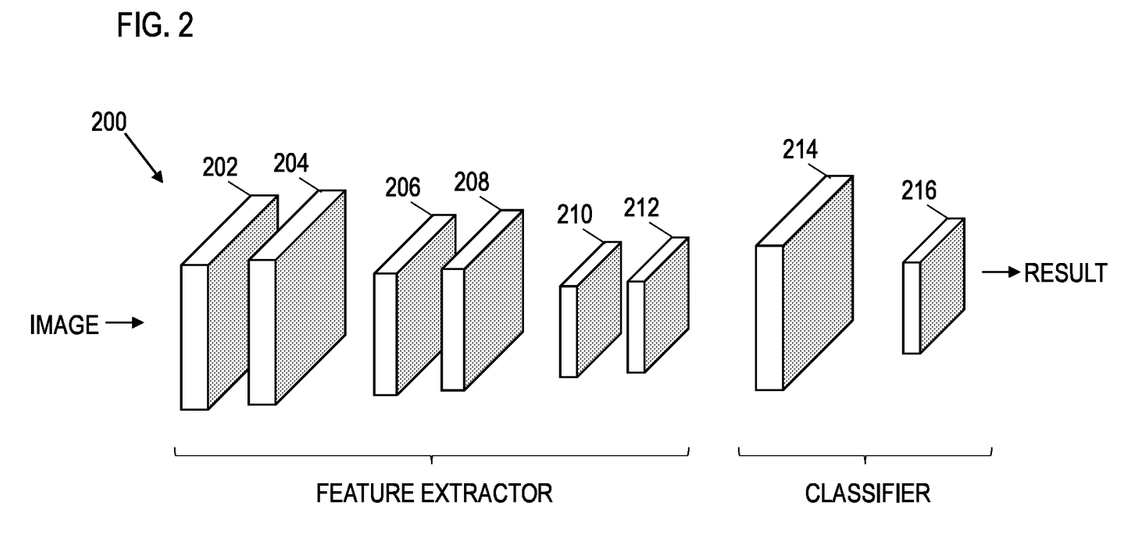
FIG. 2 shows a schematic level diagram for an example convolutional neural network suitable for use in validating well data in accordance with the present disclosure.

FIG. 2 shows a schematic level diagram for an example convolutional neural network 200 suitable for use in validating well data in accordance with the present disclosure. The convolutional neural network 200 is suitable for use as the machine learning model 104. The convolutional neural network 200 includes convolutional layers and pooling layers configured as a feature extractor, and fully connected and output layers configured as a classifier.

The feature extractor includes convolution layers 202, 206, and 210. Each convolution layer is followed by a pooling layer 204, 208, or 212. The convolution layers 202, 206, and 210 apply a filter to the pixel data of an image received as input to identify a feature in the data. Output of a convolution layer is termed feature map data. Each pooling layer down samples the feature map data generated by the preceding convolution layer. Implementations of the convolutional neural network 200 may include any number of convolution layers and pooling layers.

The classifier includes a fully connected layer 214 and an output layer 216. The fully connected layer 214 is a feed-forward neural network that converts the output of the preceding layer into a vector. The fully connected layer 214 processes the vector to predict classifications. The output layer 216 executes a softmax activation function to generate probability values with respect to each classification implemented by the convolutional neural network 200. For example, the output layer 216 may provide a value indicating the likelihood that a well pad is present at location of an image purported to be a well location.

Figure 3:
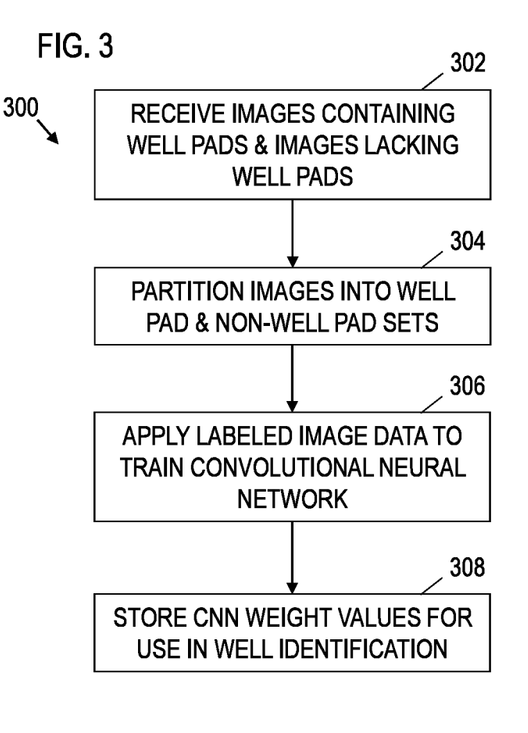
FIG. 3 shows a flow diagram for an example method for training a convolutional neural network to validate well data in accordance with the present disclosure.

FIG. 3 shows a flow diagram for an example method 300 for training a convolutional neural network to validate well data in accordance with the present disclosure. Though depicted sequentially as a matter of convenience, at least some of the actions shown can be performed in a different order and/or performed in parallel. Additionally, some implementations may perform only some of the actions shown. An implementation of the method 300 may be applied to train the machine learning model 104.

At step 302, image data including well pads and image data lacking well pads is received.

At step 304, the images including well pads are partitioned into a first set or group, and the image lacking well pads are partitioned into a second set or group.

In step 306, the image data of the first and second sets is applied to train a convolutional neural network, such as the convolutional neural network 200, to identify features of a well pad in an image.

The step 308, the weight values generated by training are stored for use in the machine learning model 104.

Figure 4:
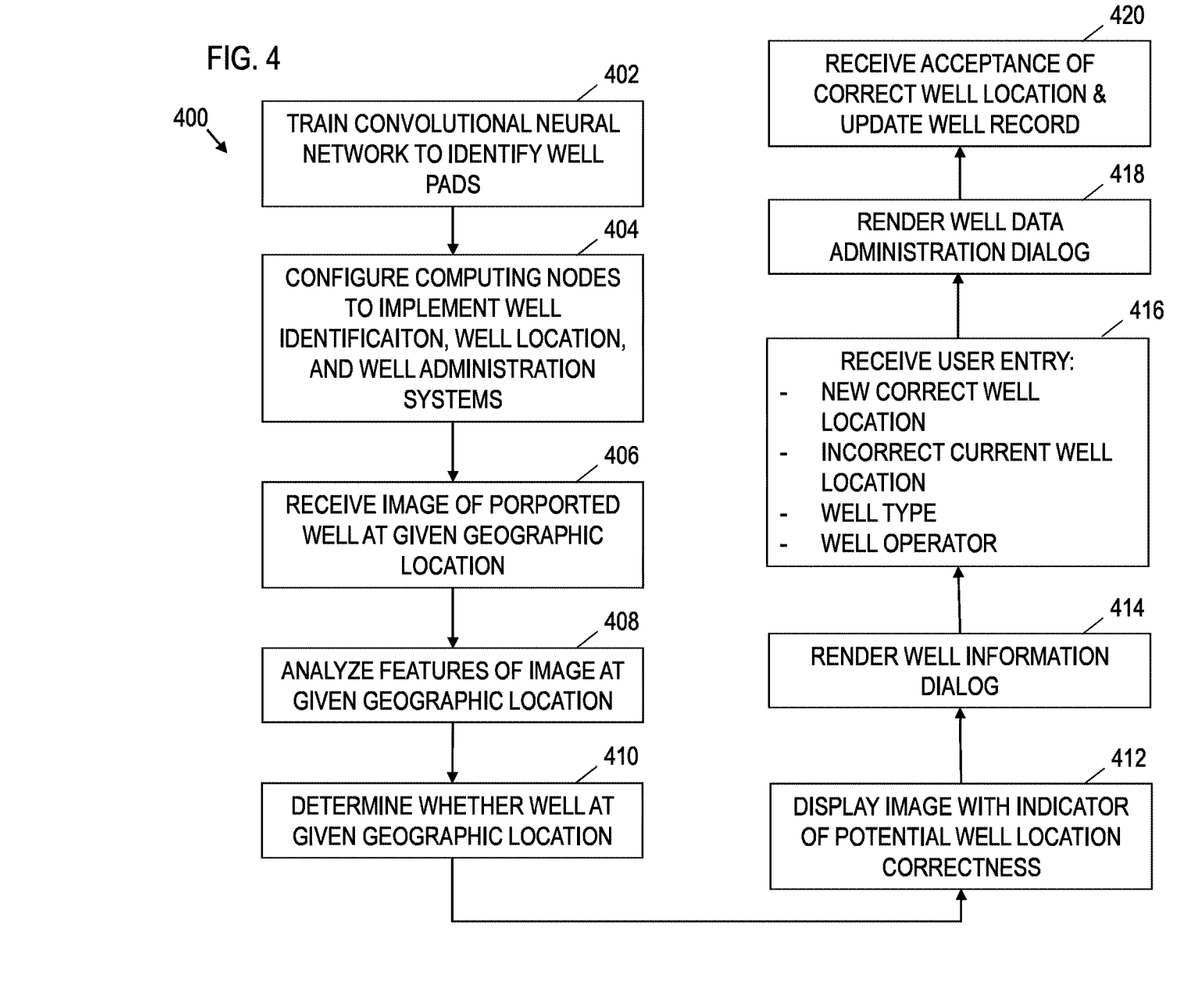
FIG. 4 shows a flow diagram for an example method for validating and correcting well data in accordance with the present disclosure.

FIG. 4 shows a flow diagram for an example method 400 for validating and correcting well data in accordance with the present disclosure. Though depicted sequentially as a matter of convenience, at least some of the actions shown can be performed in a different order and/or performed in parallel. Additionally, some implementations may perform only some of the actions shown. The method 400 may be implemented by an embodiment of the well data validation and correction sub-system 100.

In block 402, the machine learning model 104 is trained to identify a well pad in an image. For example, the method 300 may be applied to train the machine learning model 104.

In block 404, one or more computing nodes is configured to implement the well identification system 102, the well location system 106, and the well data administration system 116. For example, the one or more computing nodes may be provided with instructions that are executed to perform the functions of the well identification system 102, the well location system 106, and the well data administration system 116 disclosed herein.

In block 406, the well identification system 102 retrieves an image and an associated well data record from the database 110. The well data record may specify a geographic location at which a well is purportedly located in the image.

In block 408, the well identification system 102 provides a portion of the image data about the purported location of the well to the machine learning model 104. The machine learning model 104 analyzes the image data to determine whether features of the image data correspond to features of a well pad.

In block 410, the machine learning model 104 classifies the image data as to whether or not a well pad is present. Based on the determined presence of a well pad at the purported location of the well, the well identification system 102 stores an indication of the correctness of the purported well location in the database 110 with the well record and the image.

In block 412, the well location system 106 generates a display (e.g., on the user terminal 114) showing the image with an indication of the purported well location and the correctness thereof superimposed on the image. If multiple locations for the well have been proposed (e.g., by user input), then an indication may be displayed for each suggested location.

In block 414, the well location system 106 generates a dialog 108 or other user interface display that presents information regarding the well and allows a user to enter information pertinent to the well. For example, the dialog 108 may allow the user to propose that a currently displayed location of a well is incorrect, allow the user to enter a suggested new correct geographic location for the well, allow the user to enter well type information, allow the user to enter well operator information, etc.

In block 416, the well location system 106 receives user entered information regarding the well. For example, the well location system 106 may receive notification that a displayed location of a well is incorrect, a suggested new correct geographic location for the well, well type information, well operator information, well status information, etc. The well location system 106 may update the image display to indicate correctness of the purported well location and show a suggested well location proposed by the user.

In block 418, the well data administration system 116 generates a well data administration dialog 118 or other user interface display showing information related to wells for which the location may be incorrect as determined by the well identification system 102 or user entry, wells for which users reported other errors or provided information etc. For each such well, an image with indications of the various possible locations of the well, and pertinent information, such as user provided information, may be displayed.

In block 420, the well data administration system 116 receives information indicating that a suggested location for the well has been accepted to be the correct location for the well. For example, a user (e.g., an administrator of the hydrocarbon exploration system 101) may select a user suggested well location to be the correct location of the well via the well data administration dialog 118 of block 418. The well data administration system 116 updates the well data records 113 for the well to reflect the correct location for the well.

The hydrocarbon exploration system 101 may apply the well location as corrected by the well data validation and correction sub-system 100 to identify, evaluate, and/or manage hydrocarbon reservoirs.

Figure 5:
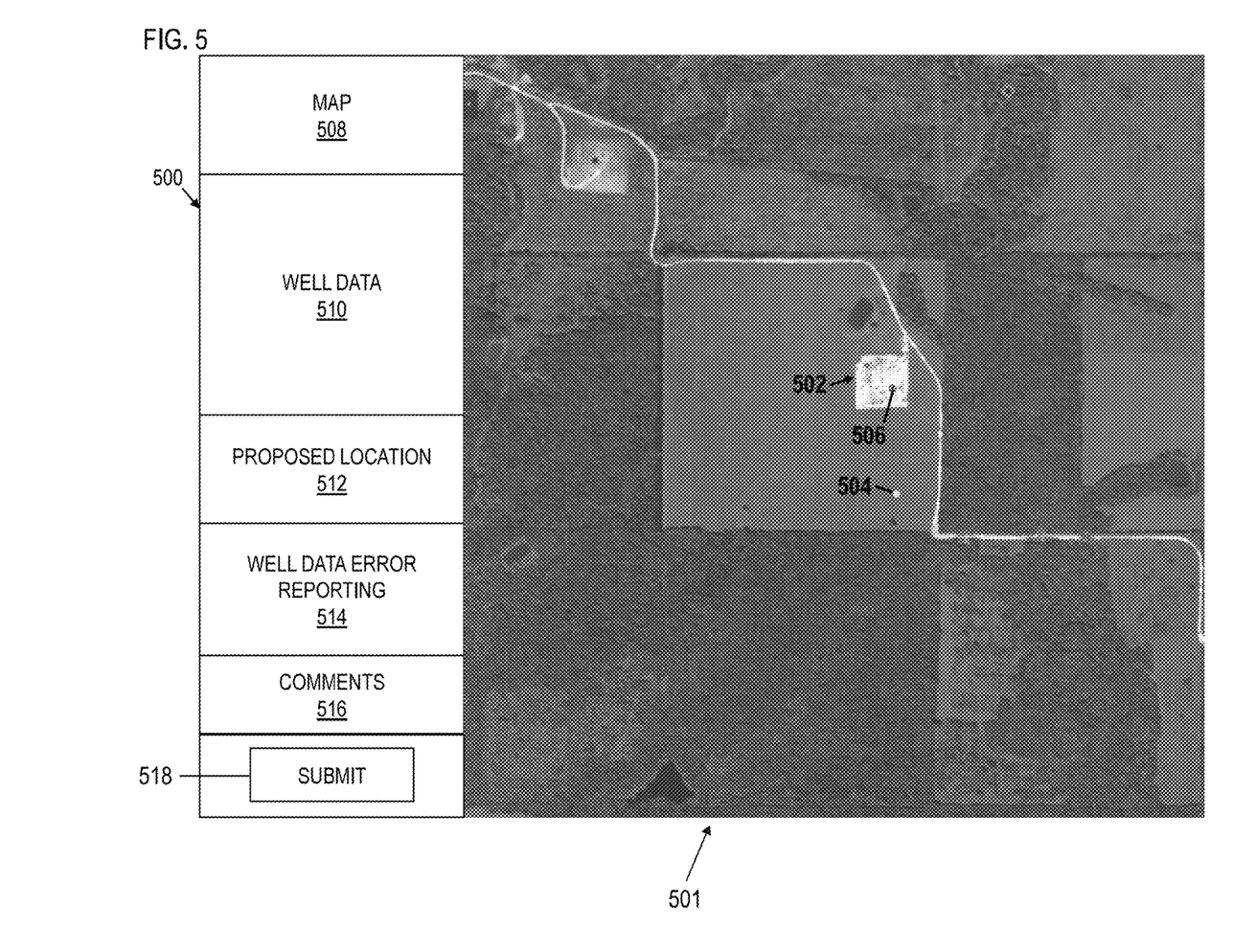
FIG. 5 shows an example dialog generated by a well location system for use in correcting well location and other well data in accordance with the present disclosure.

FIG. 5 shows an example dialog 500 generated by the well location system 106 for use in correcting well location and other well data in accordance with the present disclosure. The dialog 500 includes a satellite image 501 of the geographic area in which a well is located. A well pad 502 is shown on the satellite image 501. An indicator 504 of a well location deemed to be incorrect by the well identification system 102 is shown outside the well pad 502, and an indicator 506 of a well location suggested to be correct by a user is shown inside the well pad 502. The indicator 504 and the indicator 506 may be rendered in different colors or shapes to distinguish suggested correct well locations from well locations deemed incorrect.

The dialog 500 includes fields providing a variety of information pertinent to the well. The dialog 500 may include a map field 508, a well data field 510, a proposed location field 512, a well data error reporting field 514, and/or a comments field 516. The map field 508 shows the location of the satellite image 501 in a broader geographic area for context. The well data field 510 shows information pertinent to the well, such as well type, well operation, well depth, well status, etc. as provided in a well data record 113. The proposed location field 512 allows a user to suggest that the location of the well (e.g., the location of the indicator 504) is in error, and to propose a correct location for the well. For example, the user may select a point on the satellite image 501 (e.g., by mouse click), such as the location of the indicator 506, to be the correct location of the well.

The well data error reporting field 514 allows the user to suggest that various fields of the well data field 510 are in error. For example, the well data error reporting field 514 may allow the user to indicate that well type, well operator, well status, or other parameter values provided in the well data field 510 are in error. The comments field 516 allows the user to enter information regarding a correct value for a parameter shown in the well data field 510 deemed to be incorrect, or to provide other information pertinent to the well.

The dialog 500 includes a button 518 that may be activated (e.g., by mouse click) to submit any information entered by the user via the dialog 500 to the well location system 106 for storage in the database 110.

Figure 6:
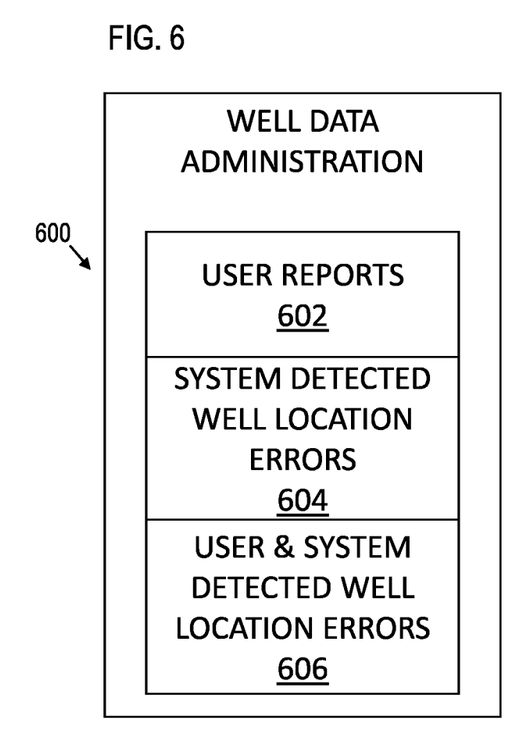
FIGS. 6-8 show example dialogs generated by a well data administration system in accordance with the present disclosure.
Figure 7:
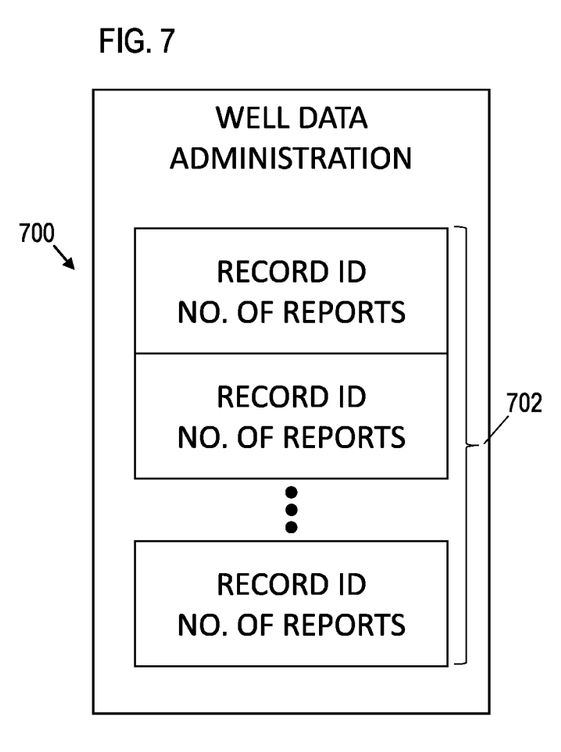
Figure 8:
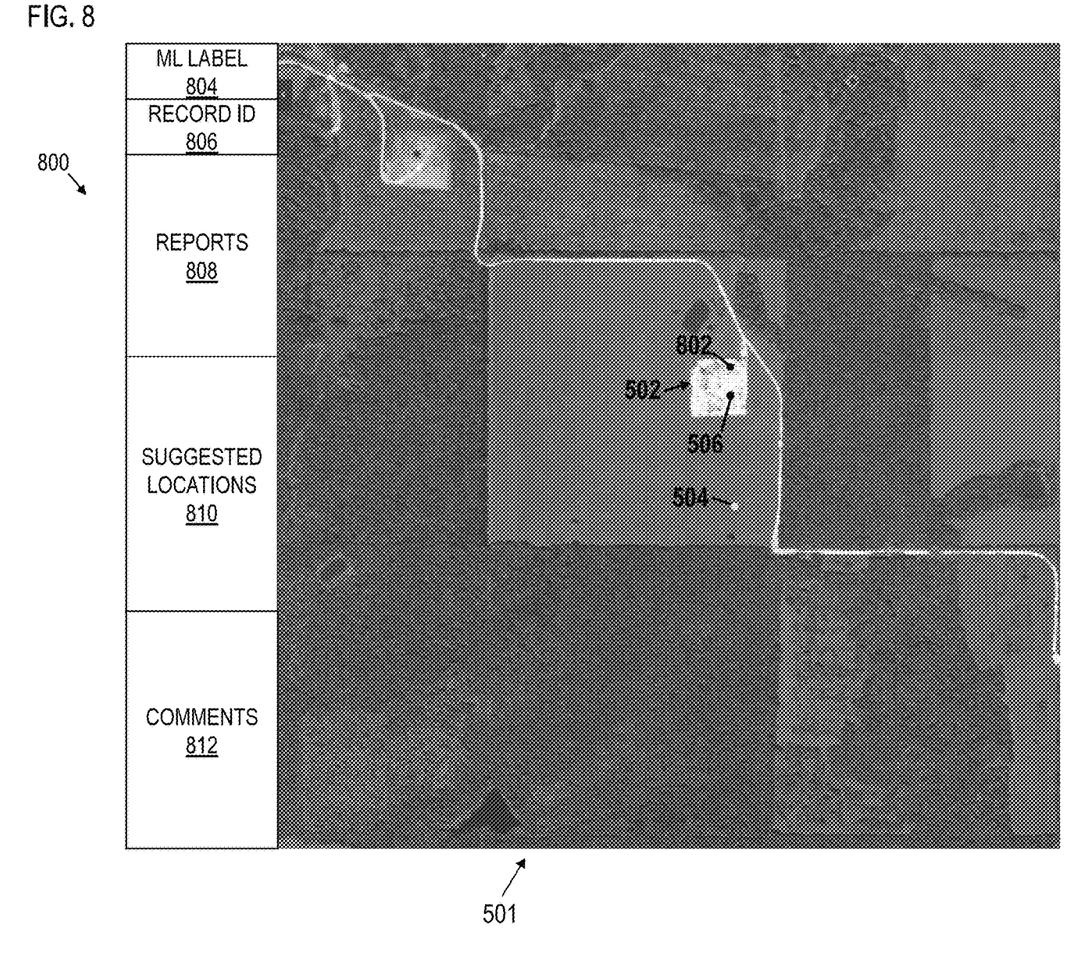

FIGS. 6-8 show example dialogs generated by the well data administration system 116 in accordance with the present disclosure. FIG. 6 shows a dialog 600 that provides an overview of the well data records that include reported well location errors or user reported information. The dialog 600 includes a user reports field 602, a system detected well location error field 604, and user and system detected well location error field 606. The user reports field 602 shows the number of errors in well data reported by users of the well data validation and correction sub-system 100. The system detected well location error field 604 shows the number of well locations deemed incorrect by the well identification system 102. The user and system detected well location error field 606 shows the number of well locations deemed incorrect by both the well identification system 102 and a user of the well data validation and correction sub-system 100 (e.g., via the dialog 500).

FIG. 7 shows a dialog 700 presenting a list 702 of well data records of one of the category fields of the dialog 600. For example, the dialog 700 may be invoked by selecting one of the fields of the dialog 600. The list of well data records presented in the dialog 700 may sorted in descending order of number of errors or reports. That is, each successive well data report down the list has fewer reported errors than the well data report provided immediately above.

FIG. 8 shows an example dialog 800 generated by the well data administration system 116 for use in administering well data in accordance with the present disclosure. The dialog 800 may be invoked by selecting one of the well data records of list 702. In this example, the dialog 800 is presenting data from the well data record associated with the well originally presumed to be located at the indicator 504. The dialog 800 includes the satellite image 501 of the geographic area in which a well is located. A well pad 502 is shown on the satellite image 501. An indicator 504 of a well location deemed to be incorrect by the well identification system 102 is shown outside the well pad 502. A first indicator 506 of a first well location suggested to be correct by a user is shown inside the well pad 502, and a second indicator 802 of a second well location suggested to be correct by a user is shown inside the well pad 502. The indicator 504 may be rendered in a first color or shape to denote the well location is deemed incorrect, and the indictors 506 and 802 may be rendered in a second color or shape to indicate suggested correct well locations.

The dialog 800 includes field providing a variety of information pertinent to the well. The dialog 800 may include a well record ID field 804, an ML label field 806, a reports field 808, a suggested locations field 810, and a comments field 812. The well record ID field 804 shows the value of an identifier associated with the well data record for which information is being displayed. The ML label field 806 shows an indication of location correctness determined by the well identification system 102 (e.g., correct well location or incorrect well location). The reports field 808 shows the various well information values suggested to be in error by users of the well data validation and correction sub-system 100 via the dialog 500. For example, well location, well type, well operator, etc. and a number of user reports associated with each may be shown in the reports field 808. The suggested locations field 810 shows the various suggested well locations (e.g., latitude and longitude) provided for the well by users of the well data validation and correction sub-system 100 via the dialog 500. The comments field 812 shows the various comments directed to the well or parameters thereof by users of the well data validation and correction sub-system 100 via the dialog 500.

The dialog 800 may allow an administrator to select one of the locations presented on the satellite image 501 to be the correct location for the well. For example, an administrator may select (e.g., by mouse click) the indicator 506 or the 802 (or a coordinate location thereof listed in the suggested locations field 810) to be the correct location of the well.

Figure 9:
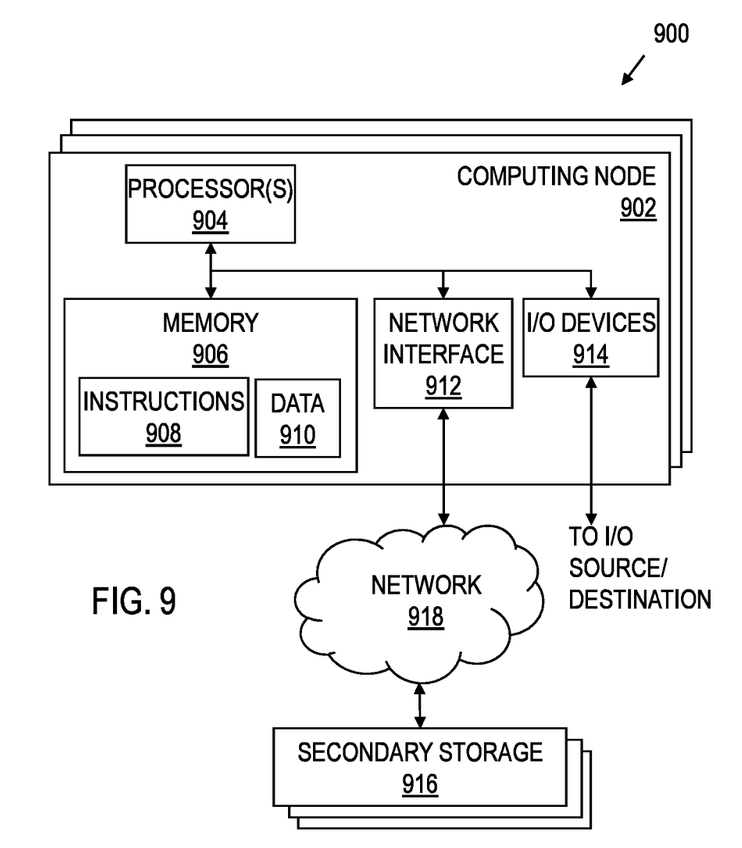
FIG. 9 shows a block diagram for an example computing system suitable for implementation of a sub-system of a hydrocarbon exploration system for validating and correcting well data in accordance with the present disclosure.

FIG. 9 shows a block diagram for a computing system 900 suitable for implementation of the system well data validation and correction sub-system 100. The computing system 900 may include computing resources provided by a cloud computing system. Examples of the computing system 900 may be applied to implement the well identification system 102, the well location system 106, the database 110, and/or the well data administration system 116. The computing system 900 includes one or more computing nodes 902 and secondary storage 916 that are communicatively coupled (e.g., via the network 918). One or more of the computing nodes 902 and associated secondary storage 916 may be applied to provide the functionality of the well identification system 102, the well location system 106, the database 110, and/or the well data administration system 116 described herein.

Each computing node 902 includes one or more processors 904 coupled to memory 906, a network interface 912, and the I/O devices 914. In various embodiments, a computing node 902 may be a uniprocessor system including one processor 904, or a multiprocessor system including several processors 904 (e.g., two, four, eight, or another suitable number). Processors 904 may be any suitable processor capable of executing instructions. For example, in various embodiments, processors 904 may be general-purpose or embedded microprocessors, graphics processing units (GPUs), or digital signal processors (DSPs) implementing any of a variety of instruction set architectures (ISAs). In multiprocessor systems, each of the processors 904 may commonly, but not necessarily, implement the same ISA.

The memory 906 may include a non-transitory, computer-readable storage medium configured to store program instructions 908 and/or data 910 accessible by processor(s) 904. The memory 906 may be implemented using any suitable memory technology, such as static random-access memory (SRAM), synchronous dynamic RAM (SDRAM), nonvolatile/Flash-type memory, or any other type of memory. Program instructions 908 and data 910 implementing the functionality disclosed herein are stored within memory 906. For example, instructions 908 may include instructions that when executed by processor(s) 904 implement the well identification system 102, the well location system 106, the database 110, and/or the well data administration system 116 disclosed herein.

Secondary storage 916 may include volatile or non-volatile storage and storage devices for storing information such as program instructions and/or data as described herein for implementing well identification system 102, the well location system 106, the database 110, and/or the well data administration system 116. The secondary storage 916 may include various types of computer-readable media accessible by the computing node 902 via the network interface 912. A computer-readable medium may include storage media or memory media such as semiconductor storage, magnetic or optical media, e.g., disk or CD/DVD-ROM, or other storage technologies.

The network interface 912 includes circuitry configured to allow data to be exchanged between the computing node 902 and/or other devices coupled to the network 918. For example, the network interface 912 may be configured to allow data to be exchanged between a first instance of the computing system 900 and a second instance of the computing system 900. The network interface 912 may support communication via wired or wireless data networks.

The I/O devices 914 allow the computing node 902 to communicate with various input/output devices such as one or more display terminals, keyboards, keypads, touchpads, scanning devices, voice or optical recognition devices, or any other devices suitable for entering or retrieving data by one or more computing nodes 902. Multiple input/output devices may be present in a computing system 900. The user terminal 114 is an example input/output device.

Those skilled in the art will appreciate that the computing system 900 is merely illustrative and is not intended to limit the scope of embodiments. In particular, the computing system 900 may include any combination of hardware or software that can perform the functions disclosed herein. Computing node 902 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Various implementations of the well data validation and correction sub-system 100 may be configured to detect and correct errors in other data types and values stored in the database 110. For example, in some implementations of the well data validation and correction sub-system 100, the machine learning model 104 may be trained to identify errors in seismic data, such as sensor location errors, and correct identified errors.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:
1. A hydrocarbon exploration system, comprising:
a plurality of computer nodes, each comprising a processor and memory coupled to the processor, and configured to implement:
a well identification system configured to:
analyze features of an image at a set of geographic coordinates;
identify a well feature corresponding to a geographic area within the set of geographic coordinates; and determine, based on a presence of the well feature, that a well is present within the geographic area; and a well location system configured to, responsive to the well identification system determining that a previously identified well location associated with the well feature is an incorrect location based on the previously identified well location being at a first subset of the set of geographic coordinates that is outside of the geographic area:

render, in the image, at the geographic coordinates, a first indication that the previously identified well location is the incorrect location of the well; and render, in the image, a second indication of a potential correct location of the well at a second subset of the set of geographic coordinates that overlaps with the geographic area.

2. The hydrocarbon exploration system of claim 1, wherein the well identification system comprises a convolutional neural network trained to identify the well feature at the geographic coordinates.

3. The hydrocarbon exploration system of claim 1, wherein the well feature is a well pad.

4. The hydrocarbon exploration system of claim 1, wherein the well location system is configured to:
display the image comprising the first indication; and
render, in conjunction with the image, a well information dialog configured to receive user entry of the potential correct location of the well.

5. The hydrocarbon exploration system of claim 4, wherein the well information dialog is configured to receive a third indication of the incorrect location of the well in the image.

6. The hydrocarbon exploration system of claim 4, wherein the well information dialog is configured to receive entry of well type information and well operator information.

7. The hydrocarbon exploration system of claim 4, wherein the plurality of computer nodes is configured to implement an administration system configured to:
render an administration dialog comprising:
a well record comprising the first indication or the third indication of the incorrect location of the well in the image; and
an entry field configured to receive acceptance of the second indication of the potential correct location as an accepted correct location of the well.

8. A method for validating and correcting well data, comprising:
configuring a plurality of computing nodes to provide a well identification system and a well location system;
analyzing, by the well identification system, features of an image at a set of geographic coordinates;
identifying, by the well identification system, a well feature corresponding to a geographic area within the set of geographic coordinates;
determining, by the well identification system, based on a presence of the well feature, that a well is present within the geographic area;
determining, by the well identification system, that a previously identified well location associated with the well feature is an incorrect well location based on the previously identified well location being at a first subset of the set of geographic coordinates that is outside of the geographic area;

rendering, by the well location system, at the geographic coordinates, a first indication that the previously identified well location is the incorrect location of the well in the image; and rendering, by the well location system, a second indication of a potential correct location of the well in the image at a second subset of the set of geographic coordinates that overlaps with the geographic area.

9. The method of claim 8, wherein:
the well identification system comprises a convolutional neural network; and
the method further comprises training the convolutional neural network to identify the well feature in the image.

10. The method of claim 8, further comprising:
displaying, by the well location system, the image comprising the first indication; and
rendering, by the well location system, in conjunction with the image, a well information dialog configured to receive user entry of the potential correct location of the well.

11. The method of claim 10, further comprising receiving, by the well information dialog, a third indication of the incorrect location of the well in the image.

12. The method of claim 10, further comprising receiving, by the well information dialog, user entry of well type information and well operator information.

13. The method of claim 8, further comprising:
configuring the plurality of computing nodes to provide an administration system; and
rendering, by the administration system, an administration dialog comprising:
a well record comprising the first indication or the third indication of the incorrect location of the well in the image; and
an entry field configured to receive acceptance of the second indication of the potential correct location as an accepted correct location of the well.

14. A non-transitory computer-readable medium encoded with instructions that when executed cause one or more processors to:
implement a well identification system and a well location system;
analyze, by the well identification system, features of an image at a set of geographic coordinates;
identify, by the well identification system, a well feature corresponding to a geographic area within the set of geographic coordinates;
determine, by the well identification system, based on a presence of the well feature, that a well is within the geographic area;
determine, by the well identification system, that a previously identified well location associated with the well feature is an incorrect well location based on the previously identified well location being at a first subset of the set of geographic coordinates that is outside of the geographic area;
render, by the well location system, at the geographic coordinates, a first indication that the previously identified well location is the incorrect location of the well in the image; and
render, by the well location system, a second indication of a potential correct location of the well in the image at a second subset of the set of geographic coordinates that overlaps with the geographic area.

15. The non-transitory computer-readable medium of claim 14, wherein the instructions cause the one or more processors to implement a convolutional neural network trained to identify the well feature in the image.

16. The non-transitory computer-readable medium of claim 14, wherein the instructions cause the one or more processors to:
   display, by the well location system, the image comprising the first indication; and
   render, by the well location system, in conjunction with the image, a well information dialog configured to receive user entry of the potential correct location of the well.

17. The non-transitory computer-readable medium of claim 16, wherein the instructions cause the one or more processors to receive, by the well information dialog, a third indication of the incorrect location of the well in the image.

18. The non-transitory computer-readable medium of claim 17, wherein the instructions cause the one or more processors to:
   implement an administration system;
   render, by the administration system, a well record comprising the first indication or the third indication of the incorrect location of the well in the image; and
   render, by the administration system, an entry field configured to receive acceptance of the second indication of the potential correct location as an accepted correct location of the well.

19. The non-transitory computer-readable medium of claim 16, wherein the instructions cause the one or more processors to receive, by the well information dialog, user entry of well type information and well operator information.

20. The non-transitory computer-readable medium of claim 14, wherein the instructions cause the one or more processors to:
   update well record data using the potential correct location responsive to determining that the potential correction location is correct.

* * * * *